Figure 6:
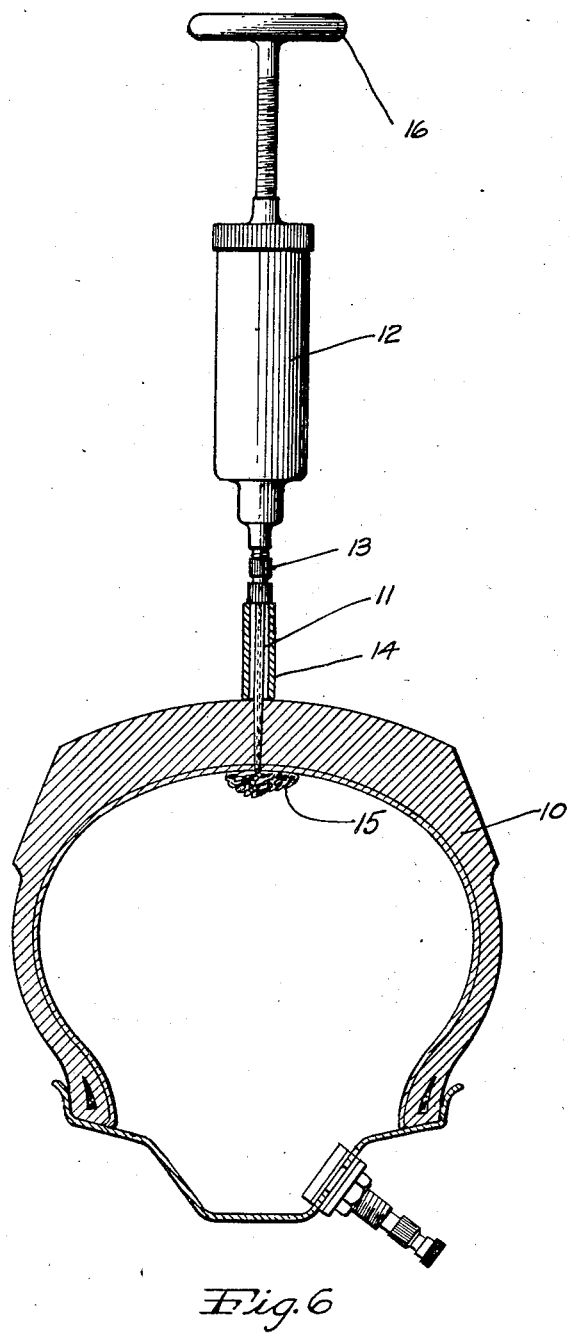

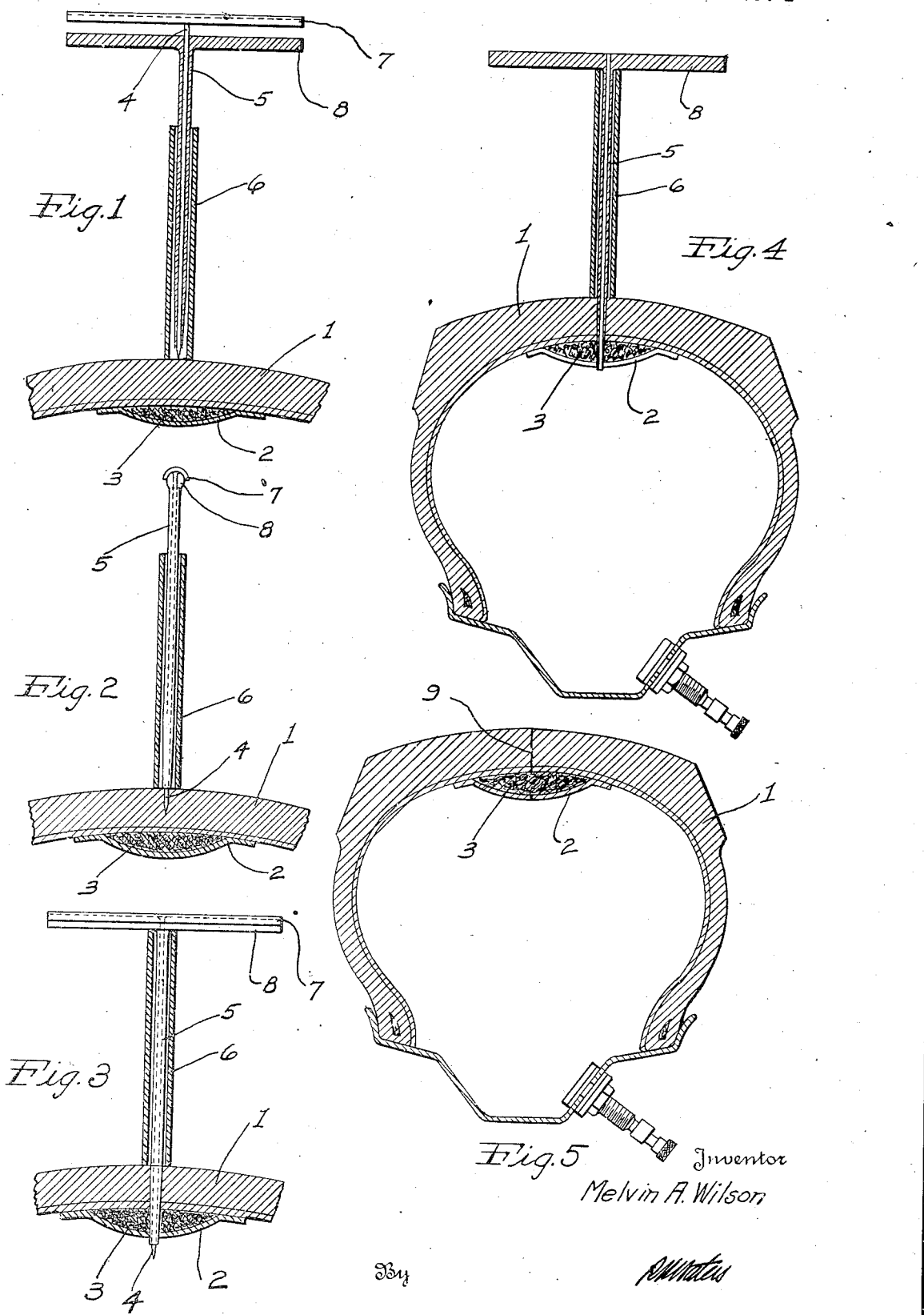
March 7, 1944.     M. A. WILSON     2,343,838
METHOD OF FILLING TIRES 100% WITH WATER
Filed April 3, 1941     2 Sheets—Sheet 1
Inventor
Melvin A. Wilson
By
Attorney March 7, 1944.  M. A. WILSON  2,343,838
METHOD OF FILLING TIRES 100% WITH WATER
Filed April 3, 1941  2 Sheets-Sheet 2

Inventor
Melvin A. Wilson

By
Attorney

UNITED STATES PATENT OFFICE 2,343,838

METHOD OF FILLING TIRES 100% WITH WATER

Melvin A. Wilson, Cuyahoga Falls, Ohio, assignor to Wingfoot Corporation, Akron, Ohio, a corporation of Delaware Application April 3, 1941, Serial No. 386,647

4 Claims. (Cl. 152—415)

This invention relates to an open-beaded tire designed particularly for a tractor or other implement. The tire is a tubeless tire and instead of filling it with air, the tire is filled with water which may contain calcium chloride or other salt to prevent freezing. The invention relates to the tire and the method of filling it and includes patches suitable for use in the tire as described.

It has recently been proposed that tractors, etc., be equipped with open-beaded tubeless tires filled completely with water. However, a practical method of completely filling such tires has presented certain practical difficulties. These are overcome according to the present invention by venting the air through the rubber of the tire while it is being filled with water. There are various ways of accomplishing the desired result.

According to this invention the hole through which the air is vented in filling a tubeless tire with water is such a hole as is made by a nail or other pointed instrument and will be referred to herein as a puncture. The preferred device is an awl which is used in conjunction with a hollow sheath, as more particularly explained below and illustrated in the drawings. The hole is made with the awl and the sheath is forced into the hole as it is kept open with the awl. The awl is then removed leaving the sheath to form an open passage through the tire. This is used to vent the air and when the tire is completely filled with water, the sheath is withdrawn, and the hole closes over.

Although after removal of the awl or sheath or other instrument the hole closes over and forms a water-tight closure, it is preferable to use some means for insuring permanent watertightness rather than to rely merely on the pressure of the rubber to prevent leakage through the hole through which the air has been vented. For this purpose the tire may be coated on the inner surface with a water resistant leak-proof composition of the usual type. Preferably a patch is provided on the inner surface of the tire at the place where the hole is to be formed. The position of the patch may be marked on the outside of the tire by any suitable designation as by a mark painted on the tire or molded into the surface of the tire. In order to completely fill the tire with water the vent must be at the top of the tire as the tire is filled and, therefore, the patch will ordinarily be at the center of the tread. If the tire is not to be held in an upright position while it is being filled with water, the patch should be somewhat off center.

The patch may be composed of soft-gum rubber stock similar to that used in bullet-proof inner tubes. It is advantageously cemented to the inside of the tire casing with a cold curing cement or some such material. After withdrawing the awl or other instrument used for puncturing the tire the fluid pressure inside the tire helps hold the patch in place. If the patch is made of soft gum stock, this is forced into the inner end of the puncture and tends to seal it. If the patch is coated with pressure sensitive adhesive on the side adjacent the tire, the adhesive is pressed into the interior end of the puncture. In either case the water in the tire is prevented from penetrating into the wall and acting on the cords and otherwise weakening the tire.

According to a preferred arrangement, a viscous material is put under the patch, and the patch then need not be of soft gum but may be of any suitable patch stock. The patch may, for example, be two inches in diameter. After removal of the needle or awl which pierces the patch as well as the tire the internal pressure within the tire forces the patch against the wall of the tire and this forces the viscous material up through the closed hole so far as this is possible. This makes a perfectly tight seal and prevents entrance of the water into the closed hole. A suitable viscous composition is composed of 1.20 parts of smoked sheet rubber, 3.05 parts of tube reclaim, 0.80 part of whiting, 0.35 part of rosin, 0.75 part of rosin oil and 2.45 parts of varnish maker's naphtha, all parts being by weight.

The tire which is to be water-filled may be the well-known type of open-beaded tire, except that it is advantageous to coat the inner surface of the tire with a film of a water-impervious coating which may be ordinary gum stock.

Before the tire can be filled with water, the beads must be properly seated on the rim. This is preferably done by air pressure rather than water pressure, because until the beads are seated the leakage of water between the beads and the rim will make it impossible practically to use water for this purpose. Therefore, in placing the tire on the rim, it is first put loosely on the rim as is usual with a tire which contains a tube. Then air is introduced into the tire through a valve in the rim which may be the type of valve usually used on an inner tube. The air causes the tire beads to spread somewhat, but until a relatively tight joint is formed between the beads and rim there will be so much loss of air that the beads will be spread to only a limited extent. An advantageous manner of spreading the beads is to encircle the tread with a belt or similar device which, on tightening, draws in the tread and thus causes the beads to spread, and if such a constricting action is combined with the pressure of air within the tire, the two forces will cause the beads to become properly seated on the rim. It is often necessary to pound the tire with a wooden mallet or the like to assist in seating the beads.

When the beads are properly seated, the air pressure within the tire is reduced to atmospheric. The tire is then filled with water or preferably a calcium chloride solution which will not freeze with the temperatures encountered during the winter months. The water may be introduced through a separate valve, or through the same valve as that used for the air in seating the tire on the rim. Various valve arrangements which provide for the use of the same valve for air and water, alternatively, have been devised.

The manner of venting the air from the tire as it is being filled with water will be described more particularly in connection with the accompanying drawings in which Fig. 1 shows an awl in place against the surface of the tire opposite a patch. Fig. 2, which is a view taken at right angles to the view in Fig. 1 shows the awl entering the tire. Fig. 3 shows the sheath surrounding the awl driven through the tire, and Fig. 4 shows a tire with the sheath driven through it and the awl removed. Fig. 5 shows the tire after it has been completely filled with water and the sheath has been removed. Fig. 6 shows apparatus used for sealing the puncture after the air has been vented from the tire. Figs. 7–10 show patches used to seal the inner end of a puncture after the air has been vented from a tire.

Fig. 1 shows a portion 1 of the top of the tire which is to be filled with water. The patch 2 is located at the top of the tire so that all air within the tire will be vented through the hole which is made through the patch. The patch is fastened to the tire at its perimeter by a suitable adhesive, but at its center is slightly separated from the tire, and the pocket 3 thus formed is filled with a viscous puncture-sealing material.

The instrument used for puncturing the tire comprises three parts, namely an awl 4, a sheath 5 and a collar or spacer 6. The awl and sheath 4 and 5 are T-shaped. Fig. 2 is a view taken at right angles to the view in Fig. 1 and shows how the curved handle 7 of the awl fits snugly against the rounded handle 8 of the sheath so that the two together operate as a single handle after the awl has been driven into the tire to the extent shown in Fig. 2.

As shown in Fig. 1 the awl fits into the sheath, and the sheath fits into the collar 6. To puncture the tire, these three instruments are placed in this relation against the tire opposite the patch, as shown in Fig. 1. By pressure on the awl, for example, by hammering the handle 7, the awl is caused to pierce the tire 1. The three instruments are then in the relation shown in Fig. 2. The handle 7 of the awl fits snugly around the handle of the sheath, but as shown in Fig. 1, there is considerable distance between the top of the collar 6 and the handle of the sheath 8. This distance is but slightly greater than the distance through the wall of the tire and the patch. By continuing the pressure on the handle of the awl, the awl is driven further into the tire and the sheath follows it until the sheath pierces completely through the tire and the patch as shown in Fig. 3. The handle of the sheath then rests against the top of the collar or spacer 6, which prevents further penetration of the awl and sheath into the tire. The awl is then removed from its sheath, and the sheath is left in the tire as shown in Fig. 4.

The dimensions of the instruments employed may, of course, vary. The difference in the height of the collar 6 and the shaft of the sheath 5 will be adjusted so that, when the sheath is driven through the wall of the tire, the collar will prevent further penetration. If the sheath should be driven too far through the tire it would be impossible to completely remove the air from the tire as a pocket of air would remain in the tire above the bottom of the sheath. The awl may, for example, be three inches long and .063 inch in diameter. The wall of the sheath may be .015 inch thick, and the diameter, of course, is just large enough to comfortably accommodate the awl. The bottom of the sheath may be bevelled on the outside to more easily permit the penetration of the sheath into the tire. The diameter of the collar 6 is, of course, not important except that it must be larger than the outside diameter of the sheath. The collar 6 may, of course, be omitted, and the extent to which the sheath penetrates the tire may be controlled by any other means, as by measuring the amount of a sheath of known length which remains outside the tire.

In filling the tire with water, after the beads have been properly seated, the water is introduced through any suitable valve means.

It has been found best not to puncture the tire until after considerable water has been introduced and there is an appreciable pressure within the tire. The tire may, for example, be punctured after the internal pressure has reached about ten pounds. After driving the awl and sheath into the tire so that the handle of the sheath rests against the top of the collar 6, the awl is removed and the air is vented through the sheath as the tire is filled with water. Complete removal of the air from within the tire is indicated by the water spurting out the hole through the sheath. When the water starts to spurt out the top of the sheath, the sheath is withdrawn from the tire. The hole 9 which is left closes in as indicated in Fig. 5. Using a viscous material 3 with a patch 2, as illustrated in the drawings, the internal pressure on the patch forces the viscous material into whatever opening is left by the closed hole 9, and a tight seal is formed. The water pressure within the tire is then increased to any desired amount. Pressures of 25 to 35 up to 40 pounds or so have been used satisfactorily.

Apparatus used in an alternative method of venting the air is shown in Fig. 6. The tire 10 is punctured by an awl or other instrument pushed through the hollow needle 11 before the force gun 12 is connected to the needle at the union 13. The needle is then pushed down into the tire while the awl is still within it. The operation is in all respects similar to that illustrated in Figs. 1–3. The collar 14 controls the distance the needle enters the tire. When the needle has been inserted in the tire the awl is removed, and air is vented from the tire through the opening thus formed. After all the air has been removed the force gun 12 is united to the needle by the union 13. The gun contains a viscous sealing composition which may be prepared according to the formula given above. A small amount of this composition 15 is ejected from the gun by turning the handle 16. This closes the inner end of the puncture when the hollow needle 11 is withdrawn. Water-tightness of the puncture is insured by the presence of the sealing composition.

The patch of Figs. 1 to 5 has been described as a patch placed in a new tire by the tire manufacturer. Of course, the patch may be placed in the tire by the tractor manufacturer, or even by the tractor user. Several patches designed for this purpose are shown in the drawings.

Figure 7:
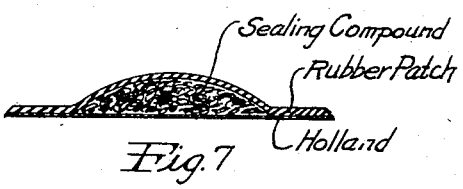
Figure 8:
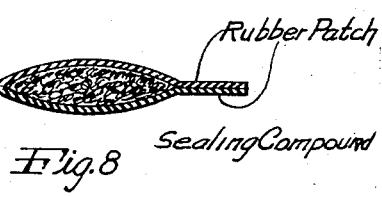

Fig. 7 shows a patch which comprises an ordinary rubber patch with sealing compound underneath the center of it. The bottom is covered with ordinary holland. Fig. 8 shows a patch in which the sealing compound is enclosed between two pieces of rubber. Either patch is fastened to a tire in the usual way. The holland is, of course, removed from the patch shown in Fig. 7 before attaching the patch to the tire.

Figure 9:
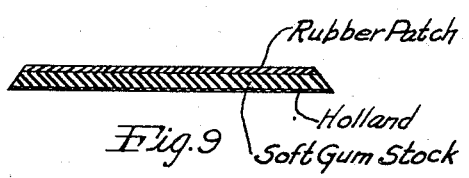
Figure 10:
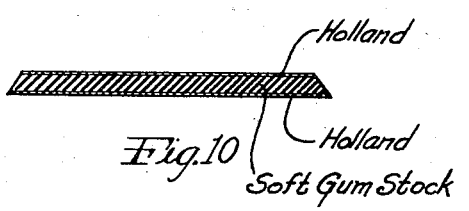

Fig. 9 shows a patch composed of ordinary rubber patch stock and a soft gum stock. The soft gum stock is protected by holland. Fig. 10 shows a patch composed solely of soft gum stock protected on both sides of holland. Both patches are united to the tire in the way any usual patch is united to a tire, after removal of the holland.

The "soft gum stock" referred to herein may be formulated according to the above formula for a viscous sealing composition, except that the solvent is omitted.

What I claim is:

1. That method of completely filling a straight-side, inextensible bead type tire with liquid which includes the steps of applying a self sealing patch to the inside of the tire tread, mounting the tire alone on a rim, inflating the tire to a greater-than-atmospheric pressure with gas introduced through the rim to push the beads of the tire into complete seating and sealing relation with the bead seats on the rim, reducing the gas pressure to atmsopheric pressure, introducing liquid into the tire through the rim until a greater-than-atmospheric pressure has been built up in the tire, relieving the pressure within the tire by passing entrapped gas through a passage in the self sealing patch and the tire and positioned in substantially the uppermost portion of the wall of the tire, continuing the inflating of the tire with liquid until the liquid flows through the passage, allowing the patch to seal the inner end of the passage in the wall of the tire, and inserting additional liquid into the tire through the rim until the pressure in the tire has been built up to considerably greater than atmospheric.

2. That method of completely filling a straight-side, inextensible bead type tire with liquid which includes the steps of mounting the tire alone on a rim, spreading the beads of the tire into seating relation with the rim by reducing the circumference of the tread portion of the tire, introducing liquid into the tire through the rim until a greater-than-atmospheric pressure has been built up in the tire, relieving the pressure within the tire by passing entrapped gas through a passage positioned in substantially the uppermost portion of the wall of the tire, continuing the inflating of the tire with liquid until the liquid flows through the passage, sealing the inner end of the passage in the wall of the tire, and inserting additional liquid into the tire through the rim until the pressure in the tire has been built up to considerably greater than atmospheric.

3. That method of completely filling a straight-side inextensible bead type tire with liquid which includes the steps of mounting the tire alone on a rim, spreading the beads of the tire into seating relation with the rim by reducing the circumference of the tread portion of the tire, inflating the tire to a greater-than-atmospheric pressure with gas to push the beads of the tire into complete seating and sealing relation with the bead seats on the rim, reducing the gas pressure to atmospheric pressure, introducing liquid into the tire until a greater-than-atmospheric pressure has been built up in the tire, relieving the pressure within the tire by passing entrapped gas through a passage positioned in substantially the uppermost portion of the wall of the tire, continuing the inflating of the tire with liquid until the liquid flows through the passage, sealing the inner end of the passage in the wall of the tire, and inserting additional liquid into the tire until the pressure in the tire has been built up to considerably greater than atmospheric.

4. That method of completely filling a straight-side, inextensible bead type tire with liquid which includes the steps of mounting the tire alone on a rim, inflating the tire to a greater-than-atmospheric pressure with gas introduced through the rim to push the beads of the tire into complete seating and sealing relation with the bead seats on the rim, reducing the gas pressure to atmospheric pressure, introducing liquid into the tire through the rim, passing entrapped gas through a passage positioned in substantially the uppermost portion of the wall of the tire, continuing the inflating of the tire with liquid until the liquid flows through the passage, sealing the inner end of the passage in the wall of the tire, and inserting additional liquid into the tire through the rim until the pressure in the tire has been built up to considerably greater than atmospheric.

MELVIN A. WILSON